Feb. 21, 1939.  E. A. ESNARD ET AL  2,148,195

WASHER BEARING DEVICE

Filed May 19, 1937

Patented Feb. 21, 1939

2,148,195

UNITED STATES PATENT OFFICE 2,148,195

WASHER BEARING DEVICE

Enrique A. Esnard and Rolando Boza, Habana, Cuba; said Boza assignor to said Esnard Application May 19, 1937, Serial No. 143,626
In Cuba April 28, 1937

1 Claim. (Cl. 251—44)

This invention relates to washer bearing devices, and specially to a device for mounting and removing washers or gaskets to and from the bibb portion of a faucet in which the washer acts as sealing means when peripherally compressed against the seat of the valve.

The principal object of the invention, is to provide an easily replaceable washer bearing device and means to support same which may be applied to all standard type of faucets, without altering or modifying in any manner their present construction.

Another advantage of the invention, is that the device when applied to a faucet, and serving its purposes, will not chatter; and that it may be attached or removed without the employment of tools.

The washer bearing device of our invention, and the means for its support to the bibb of a faucet, is constructed so that when applied the washer will not rotate during the initial operations of tightening or releasing the washer to and against the seat of the valve, thus enhancing its life because of the absence of friction.

Other advantages of the invention, will be further disclosed in the course of these specifications, and clearly pointed out in the claim which forms part of same.

Referring to the accompanying drawing.

Figure 4:
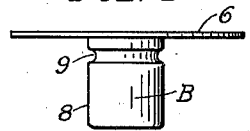
Fig. 4 is a lateral view of the washer bearing device.
Figure 6:
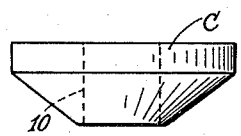
Fig. 6 is a lateral view of a preferred type of washer.
Figure 7:
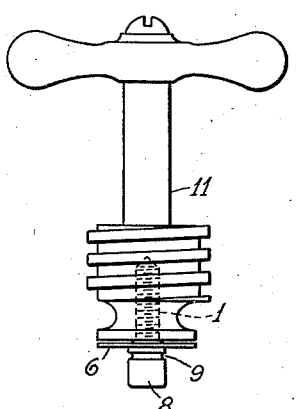
Fig. 7 is a lateral view of a bibb member of a faucet showing the position of the stem and washer bearing device mounted thereon.
Figure 5:
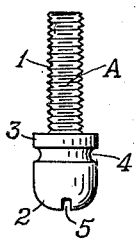
Fig. 5 is a lateral view of the stem member employed to secure the device to the bibb of a faucet.
Figure 8:
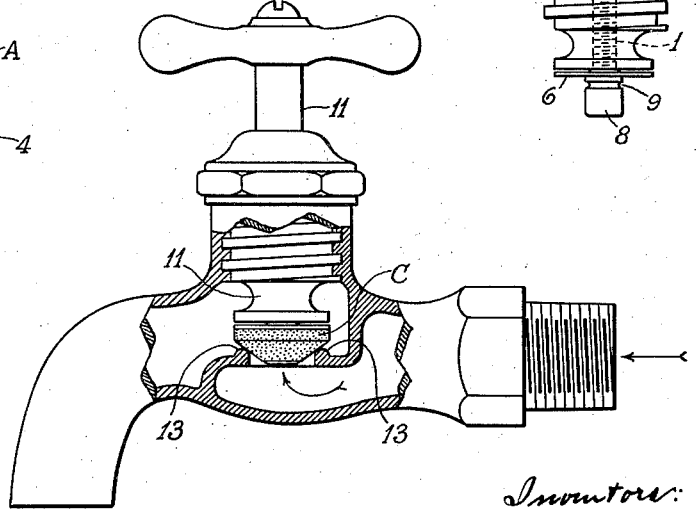
Fig. 8 is a side view, partially broken away and in section of a faucet having the improved washer bearing device embodied thereon.

Referring to the drawing and specially to Figures 4, 5 and 6 the device is characterized by three principal portions designated by the letters A, B and C.

The portion A, as shown in Figure 5, is a stem member provided in its shank with a screw thread 1 which for the purpose of being available for application to ordinary types of faucets is constructed of the same diameter as the bore in the lower section of a standard bibb body 11 of a faucet to sustain the washer in position. The stem member A, is provided with an enlarged cylindrical head 2, having a butt 3, to limit its entry in the bore of the bibb 11, having a constricted neck 4, immediately adjacent to the butt and positioned at the proper distance to receive an annular shoulder 9 to engage it to the washer bearing device B, and a groove 5, to actuate same into and from position in the bore of the bibb 11.

The portion B, as illustrated in Figure 4, is the washer bearing member proper. It consists of a circular flange 6, adapted to be arranged flush with the lower section of the bibb body 11 of a faucet and to aid in sustaining the washer, and having an axial opening 7, of a diameter slightly larger than that of the head of the stem member A; a tubular body 8, concentric with the axial opening 7 in the flange 6; such body 8 being provided at a distance almost adjacent to its union to the flange 6 and at the proper distance therefrom with an annular shoulder or rib 9, serving to swivelly engage into the constricted neck 4 in the stem member A.

Figure 1:
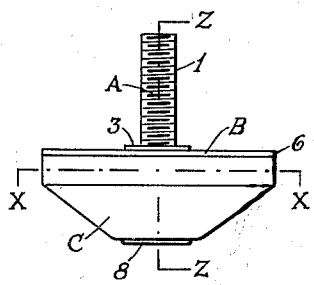
Fig. 1 is a lateral view of the washer bearing device showing the washer mounted thereon and disclosing the upper section of the stem member which serves to secure same to the bibb body of a faucet.
Figure 2:
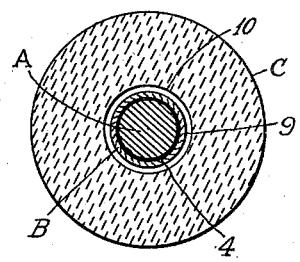
Fig. 2 is a sectional horizontal view taken along the lines X—X of Figure 1.
Figure 3:
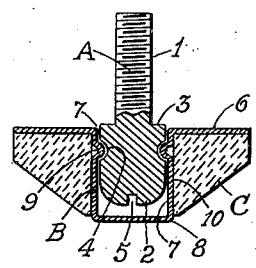
Fig. 3 is a partial sectional vertical view taken along the lines Z—Z of Figure 1.

And the portion C, as shown in Figure 6, is a washer or gasket, made preferably of a yielding or elastic material with an axial opening 10, and conic, semi-conic or conicocylindrical in shape. As shown in Figures 1, 2 and 3, a preferred type of washer is mounted on the washer bearing device portion B, thru its axial opening 10. For this purpose the bore 10, in the washer, should be a diameter slightly smaller than that of the tubular body 8, so that the inherent resiliency of the material of which the gasket or washer is made permits it to be adjusted firmly into position, but easily removed when necessary without the employment of tools.

The washer or gasket C, when incorporated as above, onto the washer bearing device B, is ready to be applied to any type of faucet of a construction in which the washer or gasket acts as sealing element, by first threading the stem member A in the lower section of the bibb body 11 of the faucet. Having performed this simple operation the washer bearing device B is clamped into position over the protruding head of the stem member A, where it will be swivelly held in position as when the annular shoulder or rib 9 works into the constricted neck 4 in the head of the stem member A.

The washer bearing device so secured to the stem A, cannot chatter by the action of the liquid passing thru the valve; and because of the swivel engagement of the rib 9 into the constricted neck 4, will not rotate during the vertical movement of the bibb when it presses the washer peripherally into the seat of the valve to act as a sealing means; and likewise will not rotate in the operation of dislodging the washer to permit the flow to pass thus eliminating the destruction of the washer by friction.

From the foregoing it will also be understood, that a washer bearing device of such construction and application may be mounted and removed for replacement purposes without the aid of tools.

Changes or modifications may be introduced in the construction of the device, the stem member support and the washer, without departing from the spirit of the above specifically described invention, as defined by the appended claim.

Having thus described the invention, what we claim is:

A device of the character described consisting essentially of a stem member having a threaded shank adapted to be screwed into a faucet element and also being provided with an enlarged substantially cylindrical head, said head having an annular groove extending therearound, a washer bearing member comprising essentially a tubular body having a circular flange at one end thereof, said flange being adapted to seat against said faucet element, said tubular body being provided with a hollow annular projection so positioned as to fit into said annular groove when said flange bears against said faucet element, and a washer mounted on said washer bearing member and including a shoulder engaging in the groove defined by the back of the said annular projection.

E. A. ESNARD.
ROLANDO BOZA.